United States Patent [19]

Sims et al.

[11] 4,261,527
[45] Apr. 14, 1981

[54] APPARATUS FOR PREVENTING DAMAGE TO A TAPE PLAYER HEAD

[75] Inventors: Dana T. Sims, Lansdale; Donald G. Senior, Quakertown; Alvin E. Thompson, North Wales, all of Pa.

[73] Assignee: Ford Aerospace & Communications Corporation, Detroit, Mich.

[21] Appl. No.: 970,610

[22] Filed: Dec. 18, 1978

[51] Int. Cl.³ .............................................. B65H 17/48
[52] U.S. Cl. ................................ 242/55.19 A; 242/198
[58] Field of Search ........................... 242/197–200, 242/55.19 A; 360/92–96, 132, 60; 352/78 R, 78 C

[56] References Cited

U.S. PATENT DOCUMENTS

| 3,482,792 | 12/1969 | Auld | 242/55.19 A |
|---|---|---|---|
| 3,647,987 | 3/1972 | Trammell | 360/132 |
| 3,650,378 | 3/1972 | Kakiuchi et al. | 206/1 |
| 3,755,641 | 8/1973 | Rackman | 200/163 |
| 3,761,097 | 9/1973 | Borman | 242/55.19 A |
| 3,839,736 | 10/1974 | Hoshall | 360/132 |
| 3,913,814 | 10/1975 | Suzuki | 242/55.19 A |
| 3,971,071 | 7/1976 | Urayama | 360/132 |

FOREIGN PATENT DOCUMENTS 46-1992  1/1971  Japan ........................................ 360/60

Primary Examiner—Leonard D. Christian
Attorney, Agent, or Firm—Paul K. Godwin, Jr.; Clifford L. Sadler

[57] ABSTRACT

A mechanism for preventing endless loop type cartridges from entering a cartridge type tape deck when the cartridge is in an orientation other than the single prescribed orientation. The embodiment is a lever mounted in the deck biased towards the insertion path of the cartridge to engage a notch in the side of the cartridge when the cartridge is inserted upside down.

9 Claims, 5 Drawing Figures

U.S. Patent
Apr. 14, 1981
4,261,527
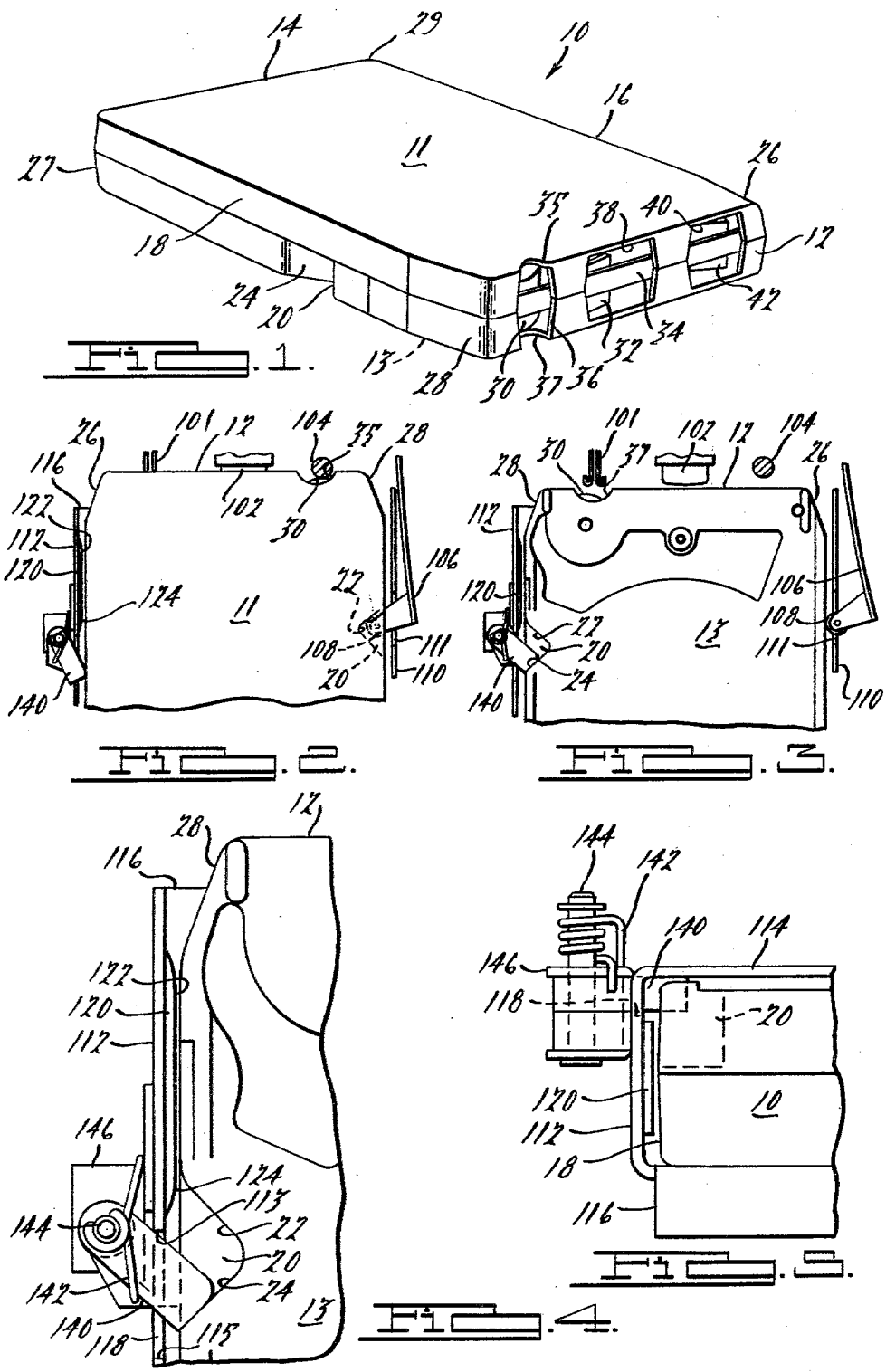

APPARATUS FOR PREVENTING DAMAGE TO A TAPE PLAYER HEAD

BACKGROUND OF THE INVENTION

1. Field of the Invention

The present invention is related to the field of cartridge type tape players and recorders. More specifically, the present invention relates to a damage prevention mechanism for such players and recorders.

2. Description of the Prior Art:

In conventional type cartridge tape players/recorders of the type described in U.S. Pat. No. 3,482,792 (incorporated herein by reference), endless loop cartridges may be inserted through a front aperture until the exposed tape comes in contact with the tape head of the player. At that point, the catridge is locked in place and the tape is pulled across the head by interaction of a rotating capstan with a pinch roller in the cartridge.

Misuse of the decks, due to upside down insertion of the cartridges by the operator, may cause head damage or misalignment of the head, with respect to prescribed tracks on the tape. Such head damage or misalignment in turn requires expensive repairs for correction.

Various channels, stops and aperture configurations have been suggested, such as in U.S. Pat. No. 3,650,378, that are intended to prevent ambiguity in the insertion of a cartridge through an aperture. However, such suggestions would require modification of the present cartridge standards agreed upon throughout the industry and would not be applicable to prevent damage by those misused cartridges which meet current standards.

SUMMARY OF THE INVENTION

The present invention overcomes problems which occur due to the insertion of a cartridge into a tape deck, when that cartridge has an orientation other than the single prescribed orientation. The present invention not only prevents full insertion of a cartridge into a tape deck when an attempt is made to insert the cartridge upside down, but also prevents full insertion of the cartridge when at attempt it made to insert it backwards.

Furthermore, the present invention performs its protection functions without necessitating changes to endless tape cartridges, as they are now standardly configured in the industry under Electronic Industry Association Standard RS-332 type 3 and International Tape Association Standard ITA-A-103.

The present invention comprises a camming mechanism which, due to the configuration of the standard cartridge, will allow the cartridge to be inserted in its proper upright position but will engage and block insertion of the cartridge when it is in any other orientation configuration.

BRIEF DESCRIPTION OF THE DRAWINGS

FIG. 1 is a view which illustrates a conventional endless loop tape cartridge of the type commonly employed in the audio tape industry.

FIG. 2 is a view which illustrates the present invention as it is configured and operated by a cartridge inserted in a proper upright position.

FIG. 3 is a view which illustrates the present invention operating on a cartridge inserted upside down.

FIG. 4 is a detailed view of the invention shown in FIG. 3.

FIG. 5 illustrates a detailed side view of the present invention as it functions to block the insertion of an improperly oriented cartridge.

DESCRIPTION OF THE PREFERRED EMBODIMENT

The present invention is intended to be used in conventional cartridge type tape players and recorders (decks), which are adapted to receive and engage endless loop type cartridges such as that shown in FIG. 1. The conventional cartridge 10, shown in FIG. 1, is generally rectangular in shape, having a top 11, a bottom 13, a forward end 12, a rear end 14, a smooth side 16, and a side 18 having an indentation 20 in its lower half, adjacent the bottom 13. The forward end 12, of the cartridge 10, has apertures 36, 38 and 40 which expose a portion of an endless loop of magnetic tape 34. A pinch roller 30 is also exposed through aperture 36, and biased tape pressure pads 32 and 42 are respectively exposed through apertures 38 and 40. The front end 12 of the cartridge 10 is slightly shorter than the rear end 14 due to tapering edges 26 and 28, which connect the front end 12 to respective sides 16 and 18. The tapering surfaces 26 and 28 serve to provide a readily visible orientation indication and also provide for easier insertion of the cartridge into the tape deck. On the rear end of the cartridge 10, the corners 27 and 29 are relatively sharp and squared off as compared to the forward end of the cartridge.

An indentation 20 is located in the lower half of the side 18 and serves to allow an engaging device to accurately position the properly inserted cartridge with respect to the drive capstan/tape head and hold the cartridge in that position until the cartridge is withdrawn.

In FIGS. 2 and 3, representation of the present invention is indicated with respect to conventional elements found on conventional cartridge type tape decks. In FIG. 2, a cartridge 10 is shown properly inserted and accurately positioned in a tape deck. The proper insertion orientation of the cartridge is for the top 11 to correspond to the top of the tape player and have the forward end 12 be the first part inserted into the tape deck.

The tape deck is illustrated as having a bottom platform 116 and vertical sides 110 and 112 extending upward from the platform 116 on the top 114. A tape head 102 is located at the forward end of the tape deck and a capstan drive 104 is located to the right side of the head 102. An end-of-track sensor 101 is located to the left side of the head 102.

A roller 108 is mounted on a biased spring lever 106 for movement through an aperture 111 in the side 110. When the cartridge is inserted along a path towards the head, the adjacent tapered surface and the side of the cartridge cams the roller 108 out of the path and it rolls along the side of the cartridge. The roller 108 forces the opposite side of the cartridge against a guide 120 for sliding contact with slide bearings 122 and 124. When the cartridge is being properly inserted, the roller 108 travels along the lower half of side 18 of the cartridge until the forward wall 22 of the notch 20 reaches the roller. Since the roller 108 is spring biased towards the cartridge, it ramps down the forward wall 22 of the notch 20 and engages the cartridge in aligned play/record position. Engagement is achieved when the capstan 104 contacts the pinch roller 30 and the roller 108 applies a holding force on the and rearward wall 24.

When the cartridge 10 is properly positioned for play/record, as shown in FIG. 2, the capstan 104 is engaged by the pinch roller 30 through aperture 36 and pulls the tape 34 across the head 102, which is in contact with the tape 34 through aperture 38. In addition, the track changing sensor 101 contacts the tape 34 through aperture 40. This sensor is formed by a pair of insulated conductors intended to contact tape 34. These contacts remain insulated from one another until a metallic strip spliced into the tape 34 creates a short between the conductors of the sensor 101. At that time, a track changing signal is generated and the head is responsively moved to a different vertical position.

In FIG. 3, the cartridge 10 is shown after having been mistakenly inserted into the deck, upside down. The invention for preventing full insertion of the cartridge 10 is shown in FIG. 3 as being engaged in notch 20 to prevent further insertion of the cartridge and to prevent the misoriented cartridge from contacting and possibly damaging the head 102.

The invention as shown as including a lever 140 mounted on the side of the chassis 112. The lever 140 is spring biased by a spring 142 coaxially mounted on a post 144 with the lever 140. The biasing of the lever 140 causes it to be rotated transversely into the path of the cartridge through an aperture 118 in the side of the chassis 112. Without the cartridge inserted into the deck, the biased lever 140 extends into the cartridge insertion path and abuts against the forward edge 113 of the opening 118. The position of the edge 113, with respect to the lever 140, determines the angle and distance that the lever 140 extends into the path. This angle is selected so that when the cartridge is inserted with its front end 12 first, the tapered edges 26 or 28 will cam the lever 140 out of the path of the cartridge. However, due to the configuration of the standard cartridge, if the cartridge is mistakenly inserted upside down, as shown in FIG. 3, the lever 140 will engage the notch 20 and prevent further insertion and possible damage to the tape deck mechanism.

As indicated above, the rear corners 27 and 29 of the cartridge 10 are generally squared, in comparison to the forward tapered edges. Therefore, if the cartridge is mistakenly inserted backwards so that the rear corners 27 and 29 are first to enter the deck, the lever 140 will engage the rearward edge 14 and prevent further insertion of the cartridge.

It will be apparent that many modifications and variations may be effected without departing from the scope of the novel concept of this invention. Therefore, it is intended by the appended claims to cover all such modifications and variations which fall within the true spirit and scope of the invention.

We claim:

1. In a cartridge tape deck of the type which accepts a cartridge, having a tapered forward insertion comparatively squared corners on its rear end and a pronounced indentation on one side thereof, when said cartridge inserted along a path in a predetermined orientation with respect to said deck, an improvement comprising:
   means movably mounted adjacent to and extending transversely into the path of said inserted cartridge for engaging and preventing said cartridge from being accepted by said deck when said cartridge is inserted with an orientation other than said predetermined orientation.

2. An improved tape deck as in claim 1, wherein said preventing means comprises:
   a lever biased to extend transversely into said insertion path for engaging said cartridge;
   a pivot mount adjacent said insertion path for supporting said lever on said tape deck;
   a spring for biasing said lever towards a position extending transversely into said path to engage said cartridge.

3. An improved tape deck as in claim 1, wherein said preventing means engages said indentation when said cartridge is inserted forward end first, in an upside down orientation with respect to said predetermined orientation.

4. An improved tape deck as in claim 3, wherein said preventing means comprises:
   a lever biased to extend transversely into said insertion path for engaging said cartridge;
   a pivot mount adjacent said insertion path for supporting said lever on said tape deck; and
   a spring for biasing said lever towards a position extending transversely into said path to engage said cartridge.

5. An improved tape deck as in claim 4, wherein said lever is mounted so as to extend transversely into the insertion path of said cartridge sufficiently to blockingly engage one of said squared corners of said cartridge when said rear end is inserted first and so as to be ramped out of blocking engagement position by said tapered forward end when said forward end is inserted first.

6. An improved tape deck as in claim 4, wherein said preventing means blockingly engages one of said squared corners of said cartridge when said rear end is inserted first.

7. In a cartridge tape deck of the type which accepts a cartridge, having a tapered forward insertion end, and a pronounced indentation on one side thereof, when said cartridge is inserted along a path in a predetermined orientation with respect to said deck, an improvement comprising:
   means movably mounted and extending transversely into the path of said inserted cartridge for engaging and preventing said cartridge from being accepted by said deck when said cartridge is inserted with an orientation other than said predetermined orientation.

8. An improved tape deck as in claim 7, wherein said preventing means comprises:
   a lower biased to extend transversely into said insertion path for engaging said cartridge;
   a pivot mount adjacent said insertion path for supporting said lever on said tape deck;
   a spring for biasing said lever towards a position extending transversely into said path to engage said cartridge;
   wherein said lever engages said indentation only when said cartridge is inserted with its forward end first, in an upside down orientation with respect to said predetermined orientation.

9. In a cartridge tape deck of the type which accepts a cartridge, having a defined front portion with apertures exposing tape within said cartridge, enclosed sides extending from said front portion and an enclosed back portion extending between said sides, wherein one of said sides contains a pronounced indentation, when said cartridge is inserted in a predetermined orientation with respect to said deck, an improvement comprising:
   means movably mounted in said deck for engaging said pronounced indentation when said cartridge is inserted upside down with respect to said predetermined orientation and for preventing said cartridge from being accepted by said deck.

* * * * *

UNITED STATES PATENT AND TRADEMARK OFFICE
CERTIFICATE OF CORRECTION

PATENT NO. : 4,261,527
DATED : April 14, 1981
INVENTOR(S) : Dana T. Sims et al

It is certified that error appears in the above-identified patent and that said Letters Patent are hereby corrected as shown below:

In column 3, line 55, after "insertion", insert --end,--.
In column 3, line 58, after "cartridge", insert --is--.

Signed and Sealed this

Fourth Day of August 1981

[SEAL]

Attest:

GERALD J. MOSSINGHOFF

*Attesting Officer*     *Commissioner of Patents and Trademarks*